US007266426B2

(12) United States Patent
Maturana et al.

(10) Patent No.: US 7,266,426 B2
(45) Date of Patent: Sep. 4, 2007

(54) AUTONOMOUS CONTROL UNIT-BASED CONTROL SYSTEM CAPABLE OF ACTIVE DIAGNOSTICS

(75) Inventors: Francisco Paul Maturana, Mayfield Heights, OH (US); Kenwood Henry Hall, Hudson, OH (US); Raymond John Staron, Richmond Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 504 days.

(21) Appl. No.: 10/859,389

(22) Filed: Jun. 2, 2004

(65) Prior Publication Data

US 2004/0217654 A1    Nov. 4, 2004

Related U.S. Application Data

(63) Continuation-in-part of application No. 10/808,999, filed on May 25, 2004, now Pat. No. 7,146,232, and a continuation-in-part of application No. 10/737,384, filed on Dec. 16, 2003, now Pat. No. 7,203,575.

(60) Provisional application No. 60/553,360, filed on Mar. 15, 2004, provisional application No. 60/433,892, filed on Dec. 16, 2002.

(51) Int. Cl.
*G05D 7/00* (2006.01)

(52) U.S. Cl. ...................................... 700/282

(58) Field of Classification Search ........ 700/282–289, 700/295–297, 301; 361/62–70; 714/25, 714/30, 31, 37–39, 47–51
See application file for complete search history.

(56) References Cited

U.S. PATENT DOCUMENTS

| 5,446,449 | A | * | 8/1995 | Lhomer et al. | 340/611 |
| 5,809,220 | A | * | 9/1998 | Morrison et al. | 714/12 |
| 5,999,106 | A | * | 12/1999 | Buckler | 340/870.09 |
| 6,088,689 | A | * | 7/2000 | Kohn et al. | 706/10 |
| 6,147,967 | A | * | 11/2000 | Ying et al. | 370/222 |

(Continued)

OTHER PUBLICATIONS

R.M. Neef, et al., A Layered and Distributed Approach to Platform Systems Controls, 13th International Ship Control Systems Symposium, Apr. 7, 2003, Orlando, Florida.

(Continued)

*Primary Examiner*—M. N. Von Buhr
(74) *Attorney, Agent, or Firm*—Keith M. Baxter; R. Scott Speroff (57) ABSTRACT

A control system capable of detecting an anomaly in a controlled distribution network, and related method of detecting an anomaly, are disclosed. The control system includes a plurality of autonomous control units associated with elements of a distribution network, which include at least one producer and at least one consumer interconnected by distribution lines and at least one switch. The control units execute a program, are in communication with each other, and are capable of sensing respective parameters of the elements with which they are associated. At least one of the control units is capable of determining an occurrence of an anomaly within the network by comparing sensed parameter values or values based thereupon with one or more thresholds or range limits, and at least one of the control units is capable of identifying a cause of the anomaly by switching the at least one switch and observing the parameters.

24 Claims, 6 Drawing Sheets

U.S. PATENT DOCUMENTS

| | | | |
|---|---|---|---|
| 6,240,867 B1 * | 6/2001 | Hoyle et al. | 114/65 R |
| 6,243,244 B1 * | 6/2001 | Nelson et al. | 361/64 |
| 6,459,944 B1 | 10/2002 | Maturana et al. | |
| 6,504,646 B1 * | 1/2003 | Amoruso | 359/341.1 |
| 6,516,249 B1 * | 2/2003 | Hoyle et al. | 700/282 |
| 6,647,300 B1 | 11/2003 | Balasubramanian et al. | |
| 2003/0078678 A1 | 4/2003 | Maturana et al. | |
| 2005/0192704 A1 * | 9/2005 | Wielebski et al. | 700/230 |

OTHER PUBLICATIONS

Duong Trung, Modern SCADA Systems for Oil Pipelines, Petroleum & Chemical Industry Conference, 1995. Record of Conference Papers, Industry Applications Society 42nd Annual, Denver, CO Sep. 11-13, 1995, New York, NY.

Maturana et al., Using dynamically created decision-making organizations (holarchies) to plan, commit, & execute control tasks in a chilled water system, Database And Expert Systems Applications, 2002. Proceedings. 13th International Workshop Sep. 2-6, 2002, Piscataway, NJ.

Fulp, E. W., et al., Distributed network flow control based on dynamic competitve markets, Network Protocols, 1998. Proceedings. 6th International Conference Austin, TX Oct. 13-16, 1998.

* cited by examiner

AUTONOMOUS CONTROL UNIT-BASED CONTROL SYSTEM CAPABLE OF ACTIVE DIAGNOSTICS

CROSS-REFERENCE TO RELATED APPLICATIONS

This application is a continuation-in-part of U.S. patent application Ser. No. 10/737,384 filed on Dec. 16, 2003 now U.S. Pat. No. 7,203,575 and entitled "Decentralized Autonomous Control for Complex Fluid Distribution Systems", which is based on U.S. provisional application No. 60/433,892 filed Dec. 16, 2002 and entitled "Agent-Based Active Diagnostics System for Complex Distribution Networks", and also is a continuation-in-part of U.S. patent application Ser. No. 10/808,999 filed on May 25, 2004 and entitled "Agent Program Environment", which is based on U.S. provisional patent application No. 60/553,360 filed on Mar. 15, 2004 now U.S. Pat. No. 7,146,232 and also entitled "Agent Program Environment", each of which is hereby incorporated by reference herein, and claims the benefit thereof.

STATEMENT REGARDING FEDERALLY SPONSORED RESEARCH OR DEVELOPMENT

BACKGROUND OF THE INVENTION

The present invention relates to computerized control systems such as those employed for controlling fluid distribution in a dynamic distribution network.

Systems for distributing fluids such as fuel, liquid feedstocks, refrigerants, compressed air, fluidized solids, gases, and fluid-like quantities like electricity (subject to pressure and flow through a conduit), are an important component of manufacturing operations, chemical plants, energy distribution, office buildings, and large equipment. Often these distribution systems have complex networks of conduit whose configurations can change with demand or to accommodate failure of portions of the distribution system.

An example distribution system is chilled-water distribution in a modern warship. Chilled-water provides cooling for critical electronic components and machines as well as cooling for crew quarters and work areas.

Chilled-water must be provided to high priority users even in the face of damage to the distribution network, such as may occur in wartime. Accordingly, the chilled-water is distributed through a network of redundant pipeways connected by a valve system that allows chilled-water to be routed around damaged pipe sections if necessary. Additional reliability is obtained by providing multiple chilled-water producers that may be flexibly connected to any given chilled-water consumer through the redundant pipeways.

Controlling such a chilled-water system is extremely difficult. The multiple chilled-water producers, valves, and pipeways provide a large number of configurations, each of which must be considered when programming the control system. The control system must be programmed to accommodate varying and competing demands for chilled-water as chilled-water consumers switch in and out over time. Finally, the control system must respond to highly unpredictable damage to the distribution system such as may occur in battle.

Conventional programmed control systems can effectively provide only a limited range of responses covering easily anticipated problems and may require additional human supervision and/or manual intervention undercutting the benefits that could be obtained from completely automated control.

Consequently, it would be advantageous if an improved control system for complex systems such as the aforementioned water management system could be devised. In particular, it would be advantageous if such an improved control system could be developed that was capable of automatically diagnosing and adjusting in response to damage or other problems that can occur in the operation of such water management or other controlled systems.

BRIEF SUMMARY OF THE INVENTION

The present inventors have recognized that an automatic control system for complex distribution systems does not need to anticipate all possible combinations of demand and network failure and map them to a particular network configuration. Instead, critical components of the distribution system can be associated with autonomous control units (ACUs, also referred to as agents) that are invested with a general decision-making framework that allows them to negotiate among themselves to reconfigure the network in response to unanticipated damage or changes in demand. In the preferred embodiment, the ACU use a "market-model" in which they bid for resources and evaluate solutions based on costs and available money, equipment health, and material mixing restrictions. The ACUs are distributed geographically and do not depend on central control to do tasks. The result is a highly efficient automatic control of a complex network that yields efficient solutions for unexpected situations far faster than could be obtained by manual supervision.

Further, the present inventors have recognized that by appropriately configuring the ACUs, the ACUs are capable of detecting when failures, faults or anomalies in system operation occur. Such detection can be achieved, for example, by comparing sensed parameter values relating to the distribution system components' operation (or values determined based upon this sensed information) with threshold values or by determining whether such sensed parameter values (or values based thereupon) fall outside acceptable ranges. In certain cases, the acceptable ranges can be determined through a learning process by which acceptable values associated with normal operation are accumulated and then used to formulate the acceptable ranges. Also, by appropriately configuring the ACUs, the ACUs are capable of operating to identify the causes of detected failures/anomalies. In some circumstances, the ACUs can identify the causes by progressively switching statuses of the different components of the distribution system and observing corresponding behavior of the parameters associated with the system components.

In particular, the present invention relates to a control system for a distribution network having a plurality of elements including at least one producer and at least one consumer interconnected by a plurality of distribution lines and at least one switch, where the switch governs whether flow can occur between at least two of the other elements. The control system includes a plurality of autonomous control units associated with at least some of the elements of the distribution network, where the autonomous control units execute at least one stored program and are in communication with each other, where the autonomous control units are capable of sensing respective parameters of the respective elements with which the autonomous control units are associated, and where at least one of the autonomous control units is capable of determining an occurrence of an anomaly within the distribution network.

Further, the present invention relates to a method of detecting an anomaly within a distribution network having a plurality of elements including at least one producer and at least one consumer interconnected by a plurality of distribution lines and a plurality of switches, where each of the switches governs whether flow can occur between at least two of the elements. The method includes operating a plurality of autonomous control units in association with the plurality of elements, where each of the autonomous control units is associated with at least one of the elements, and where the autonomous control units are in communication with each other. The method additionally includes obtaining values of parameters respectively associated with operations of at least some of the elements. The method further includes determining that an anomaly has occurred by way of at least one of: determining that at least one of a first value of a first parameter and a second value based upon the first value differs from an additional value by greater than a first threshold amount; and determining that at least one of the first value and the second value falls outside of a predetermined range.

The present invention further relates to a controlled distribution network. The controlled distribution network includes at least one resource producer and at least one resource consumer. The controlled distribution network additionally includes first, second, third, and fourth links, where the first and third links are both coupled to the at least one resource producer and the second and fourth links are both coupled to the at least one resource consumer. The controlled distribution network further includes first and second switchable devices, where the first switchable device is coupled between the first and second links and the second switchable device is coupled between the third and fourth links. The controlled distribution additionally includes a plurality of autonomous control units respectively associated at least with some of the at least one resource producer, the at least one resource consumer, the first, second, third and fourth links, and the first and second switchable devices. The autonomous control units are capable of sensing values of a plurality of parameters associated with operations of at least some of the at least one resource producer, the at least one resource consumer, the transmission links and switchable devices. Upon detecting an anomaly in the controlled distribution network, at least one of the autonomous control units causes at least one of the first and second switchable devices to be switched in state, observes behavior of at least one of the parameters as the at least one switchable device is switched in state, and identifies a cause of the anomaly based upon the observed parameter behavior.

The present invention further relates to a control system for a system having a plurality of components. The control system includes a network and a plurality of autonomous control units in communication with one another via the network and further configured to monitor and control at least some of the components. The autonomous control units are able to monitor a plurality of parameters of operation of the components. Additionally, the autonomous control units are capable of at least one of: (a) detecting an anomaly in an operational behavior of at least one of the components by at least one of (i) determining that at least one of the monitored parameters and a secondary parameter based upon the at least one monitored parameter has changed by an excessive amount in relation to a predetermined value, and (ii) determining that the at least one monitored parameter the secondary parameter has left a predetermined range; and (b) identifying a subset of the components that is a cause of the anomaly by controlling a plurality of the components to vary in status and deducing from the monitored parameters the subset that is the cause of the anomaly.

DETAILED DESCRIPTION OF THE PREFERRED EMBODIMENT

Figure 1:
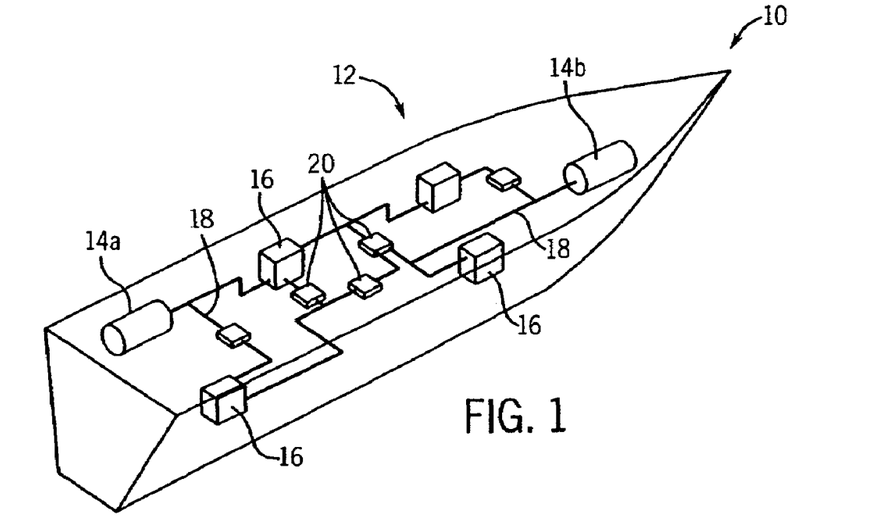
FIG. 1 is a phantom view of a warship showing a simplified chilled-water distribution system having multiple chilled-water producers, chilled-water consumers and valves.

Referring now to FIG. 1, a naval vessel 10 may include a chilled-water distribution system 12 having redundant and spatially separate chilled-water producers 14*a* and 14*b* providing chilled-water to multiple distributed chilled-water consumers 16*a* through 16*c*. The distribution is through a network of pipes 18 and control valves 20 such as to provide for multiple different paths of connection between any chilled-water producer 14 and chilled-water consumer 16.

At times, particular chilled-water producers 14, pipes 18, or valves 20 may be destroyed or rendered inoperative.

During operation, chilled-water consumers 16 may come on and go off-line at different times depending on their needs.

Figure 2:
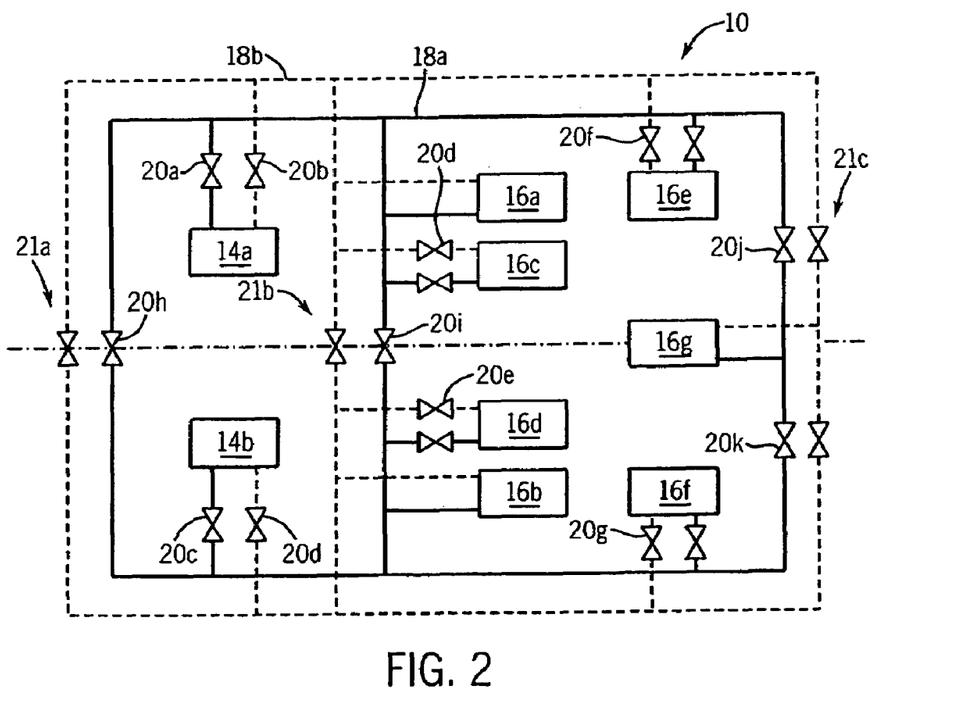
FIG. 2 is a schematic diagram the distribution system of FIG. 1 showing redundant chilled-water supply and return pipes leading to chilled-water consumers and chilled-water producers.

Referring now to FIG. 2, the two chilled-water producers 14a and 14b may each be connected to a supply pipe 18a and a return pipe 18b to provide a closed loop operation. Chilled-water producer 14a is connected through valve 20a to supply pipe 18a and through valve 20b to return pipe 18b while chilled-water producer 14b is connected through valve 20c to supply pipe 18a and through valve 20d to return pipe 18b. For the purpose of descriptive clarity, only the supply pipes 18a and its valves 20 will be described henceforth with it being understood that corresponding return pipes 18b and return pipe valves 20 will be present.

Directly connected to supply pipe 18a, to receive constant water flow therefrom, are chilled-water consumers 16a, 16b and 16g. Chilled-water consumers 16a and 16b are not subject to individual control but may be shut off by operation of valves 20 elsewhere in the system.

More importantly, other chilled-water consumers 16c through 16g may connect to the supply pipe 18a through valves 20 allowing them to be individually connected and disconnected from chilled-water. Specifically, chilled-water consumer 16c connected to supply pipe 18a via valve 20d, chilled-water consumer 16d connects via valve 20e, chilled-water consumer 16e connects via valve 20f, and chilled-water consumer 16f connects via valve 20g.

Generally, the chilled-water distribution system 12 is divided into redundant halves corresponding to the two chilled-water producers 14a and 14b. These halves are normally separated by segregation valves 20h and 20i, each associated with a pipeway branch 21a and 21b connecting the two halves, and 20j and 20k which connect in series across an additional branch 21c between the two halves. Chilled-water consumer 16g is connected at the junction of segregation valves 20j and 20k so as to freely receive chilled-water from either half. During normal operation, the segregation valves 20h, 20i, and 20j and 20k prevent mixing of chilled-water from chilled-water producer 14a with chilled-water from chilled-water producer 14b. This segregation provides an additional reliability against catastrophic failure of a pipe that, where the two halves join, might cause water loss to the entire system.

The topology of the network shown in FIG. 2 is generally arbitrary except that it allows different chilled-water producers 14 to be flexibly connected through valves 20 to a given chilled-water consumer 16 through at least two different pipeway paths. Thus, for example, chilled-water producer 14a may provide chilled-water to chilled-water consumers 16f by passing the water through valve 20a, 20h and valve 20g, or alternatively, through valve 20a, valve 20j, 20k, and 20g. In this case, a third possible path is provided through valve 20a, valve 20i, and 20g. Thus, damage to pipes in the system can be overcome. The ACUs negotiate by way of bidding and cost variations to find alternative routes. Higher degrees of redundancy and additional numbers of sources are also possible.

Figure 3:
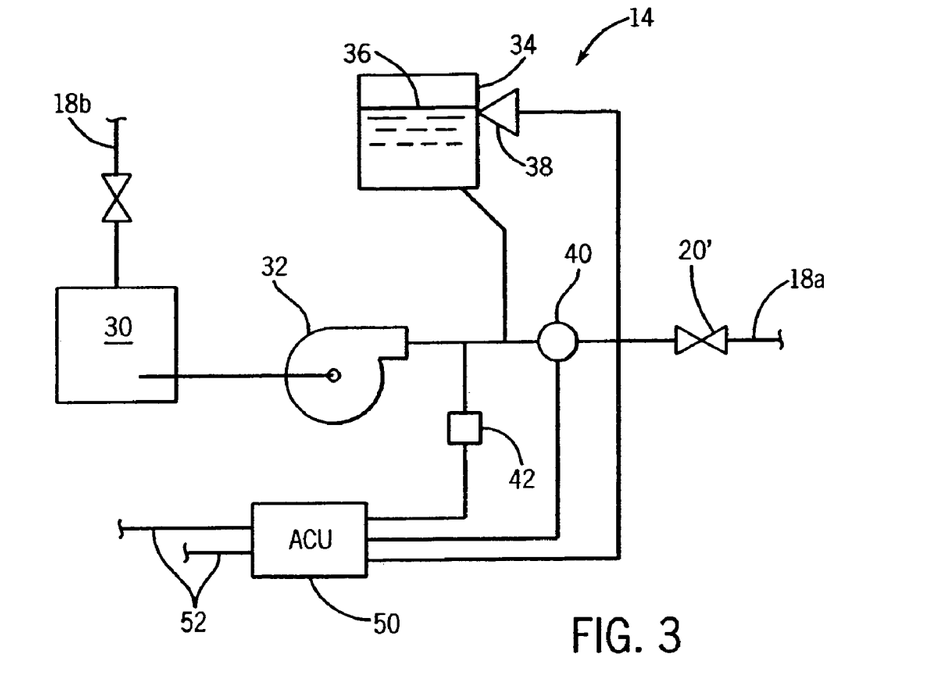
FIG. 3 is a block diagram of one chilled-water producer showing its components and sensors, including a heat exchanger, pump, accumulator tank, and flow and pressure sensors, which may be used to detect system failures and showing a connected control module implementing one or more autonomous control units associated with the chilled-water producer.

Referring now to FIG. 3, a given chilled-water producer 14 includes a heat exchanger/chiller 30 receiving heated water from a return pipe 18b through a valve 20 (20b or 20d in the example of FIG. 2) and providing chilled-water to a pump 32 which in turn provides it to a valve 20' (20a or 20c in the example of FIG. 2) to the supply pipe 18a. The output of the pump 32 communicates with an accumulator tank 34 of a type well known in the art for closed loop water systems having a water level 36 that may be sensed by water level sensor 38. The flow of water out of pump 32 may be detected by flow sensor 40 and the pressure of this water may be sensed by pressure sensor 42.

Signals from water level sensor 38, flow sensor 40, and pressure sensor 42 may be received by input circuits of a control module 50 such as a ControlLogix programmable control module commercially available from Rockwell Automation, Inc., the beneficial assignee of the present invention. The control module 50 incorporates a computer processor and memory for implementing one or more autonomous control units (ACU's) as will be described. The control module 50 may also provide output circuits to provide signals controlling the pump 32 and operation of the chiller 30 using a control program "stub" being a part of each ACU implemented by the control module 50, as will be described. The control module 50 may communicate by a single or multiple redundant networks 52 such as Control Net, Ethernet, or Wireless networks having separate network media to resist failure.

Autonomous Control of the Distribution Network

Figure 4:
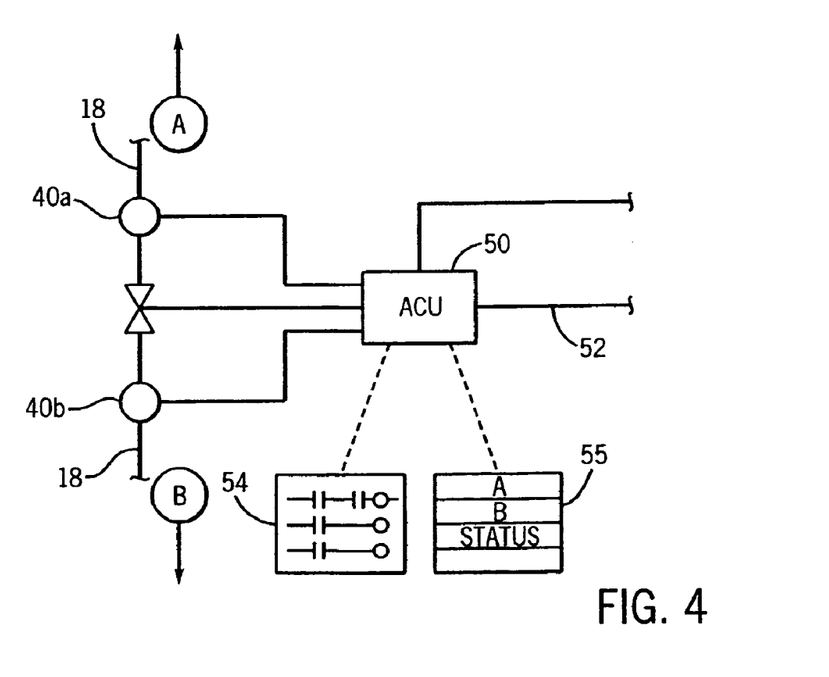
FIG. 4 is a detailed block diagram of one valve and optional sensor connected to a control module implementing an associated autonomous control unit and showing information held by the autonomous control unit during operation.

Referring now to FIG. 4, each valve 20 may also be connected to a control module 50 connected to network 52 so the control module 50 may operate the opening or closing valve 20 using an associated ACU implemented by the control module 50. In the simplest embodiment, the control module exchanges signals with the valve 20 only providing for operation of the valve and confirmation of that operation. In an alternative embodiment, however, as shown, the valve 20 may have an upstream pressure gauge 40a and a downstream gauge 40b which may provide signals to the control module 50 which may use these signals to deduce a pressure drop across the valve 20 indicating water flow. Knowing flow plus pressure can be used to deduce network conductance for detecting errors as will be described below.

Each chilled-water consumer 16 (shown in FIG. 3) may also be associated with an ACU implemented in a control module 50. By means of the ACU, each chilled-water consumer 16 may initiate a request for chilled-water based on internal considerations, for example, a temperature rise in the associated equipment or an activation signal being received by the associated equipment.

Referring again to FIG. 4, the amount of application specific information that must be programmed into the ACU is limited allowing rapid configurations of distribution control systems. As mentioned, each ACU may include a control logic stub 54, for example, implemented in relay logic or other common control program languages, that provides low level control of the valve 20 or chilled-water producer 14 or chilled-water consumer 16 and may include, in the case of a valve, logic for preventing both simultaneous opening and closing signals, for detecting valve jamming or other failure, monitoring safety, and allowing manual operation. The control logic stub may be pre-written as part of a library for a particular device such as a valve 20 or chilled-water producer 14 or chilled-water consumer 16. The control logic stub 54 may also provide variable data holding certain status information about the associated device (e.g., valve open, valve closed, valve failure) that may be read by the ACU.

The ACU also includes limited application specific information about the pipeway topology in an ACU data area 55. In the preferred embodiment, this topology information can be simply the identity of the ACU(s) associated with any upstream resources and the ACU(s) associated with any downstream resources. The cooperative operation of the ACU's allows this fragmentary information to be effectively assembled into knowledge about distribution paths. This limited need for information by the ACU's makes the system highly scalable and simple to implement in a variety of distribution systems. When the ACU data area is in an ACU associated with a chilled-water consumer 16, it may also include a priority of the chilled-water consumer as will be described below which provides a stable resolution of conflicts between chilled-water consumers 16 as will be described below.

Each ACU also includes programs (not shown) that control the behavior of the ACU as an ACU in bidding, responding to bids and communicating with other ACUs. Generally these programs are not application specific, do not require modification for each application, and can be implemented in the controller firmware. Additionally, these programs typically include communication libraries, data table access libraries, and interpreters for the ACUs' scripts. Such scripts, along with certain functions defined by additional code (which can be developed by a user through the use of a development environment, as described in U.S. provisional patent application No. 60/553,360 entitled Agent Program Environment, which is beneficially assigned to the present assignee and hereby incorporated by reference), typically include at least some of the application-specific programming for the individual ACUs.

Communication between ACUs may be provided using standard protocols such as described by The Foundation for Intelligent Physical Agents (FIPA) (at www.fipa.org) communicating bidding and other messages as well as other protocols, as taught in U.S. Pat. No. 7,069,096 entitled Global Resource Locator for Autonomous Cooperative Control Systems, U.S. Pat. No. 6,647,300 entitled: Bidding Partner Cache for Autonomous Cooperative Control System; U.S. Pat. No. 6,459,944 entitled: Self-Organizing Industrial Control System Using a Specific Process to Evaluate Bids; U.S. Pat. No. 6,430,454 entitled: Self-Organizing Industrial Control System Using Iterative Reverse Modeling To Evaluate Bids; U.S. Pat. No. 6,272,391 entitled: Self Organizing Industrial Control System Importing Neighbor Constraint Ranges, and U.S. Pat. No. 6,931,289 entitled Language Structure For Autonomous Cooperative Control System, each beneficially assigned to the present assignee and hereby incorporated by reference.

Figure 5:
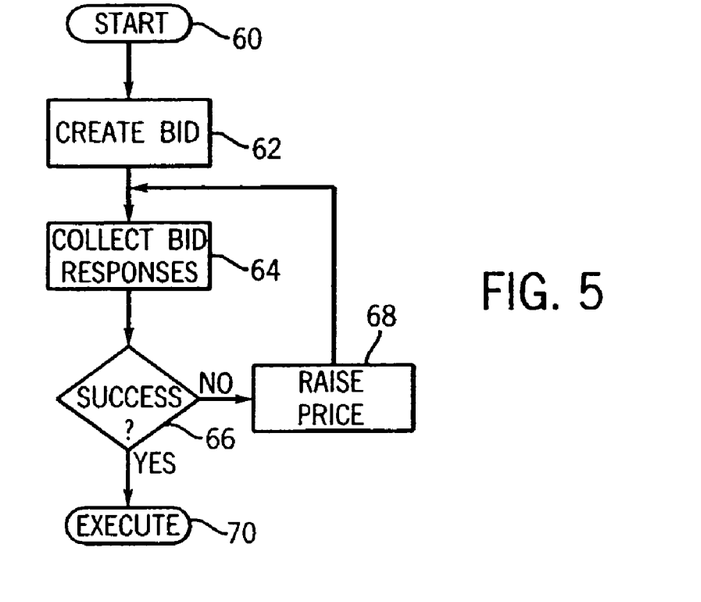
FIG. 5 is a flowchart depicting overall operation of the control system as implemented in a distributed fashion by many autonomous control units.

Referring now to FIG. 5, once each ACU is provided with its applications specific data, they may intercommunicate to organize themselves to distribute chilled-water in a bidding process. As indicated by start block 60, bidding may be initiated upon start-up of the system, a chilled-water consumer 16 (or other new resource) coming on-line, or by loss of a resource by failure or damage. The most common example will be that of a chilled-water consumer 16 requesting chilled-water as it reaches a threshold temperature at which cooling is required. At this time, chilled-water consumer 16 creates a bid request as indicated by process block 62 which is forwarded to other resources that might satisfy the bid request. The requirements of the bid request are expressed in a job description language of a type described in the above-referenced patents and in this case simply describing the need for a chilled-water source, a distribution path to a particular destination, at under a particular money limit. The other resources to which bid requests are sent are found by consulting a directory providing addresses of other ACU's having the capabilities required in the bid request.

In the present invention the bid request is initially forwarded only to chilled-water producers 14a and 14b. Chilled-water producers 14 keep track of their current loads in the form of executing bids from other chilled-water consumers 16 and will only accept a bid request if they have uncommitted capacity, or if the bid request comes from a chilled-water consumer 16 having a priority higher than a priority of existing chilled-water consumers 16 serviced by the chilled-water producer 14. In this latter case, the lowest priority chilled-water consumer is notified to disconnect itself.

At process block 64 each of the chilled-water producer 14a and 14b, having possibly satisfied the bid request requirements of providing a source of chilled-water (depending on their status and current loads), send sub-bid requests to valves 20 that might satisfy the bid request requirement of a path to the destination. The valves 20 stand as proxies for the pipes to which they are connected. Each valve 20 examines the bid request requirements, the available money, and makes a determination whether it can respond.

When a given ACU completes a bid request, typically a valve connected to the chilled-water consumer 16 making the request, the bid response and path (listing each of the resources in order from source to destination) describing a "job response" are collected and returned to the chilled-water producer 14. Bid requests that cannot complete in a given time or other limit, or for reasons of excess cost, are abandoned.

At process block 66, a determination is made by each chilled-water producer 14a and 14b as to the best job response meeting the price and capability requirements. Under a commonly implemented money rule for each bidder (e.g. a chilled-water consumer 16), the bid request may be associated with a money limit which is either an arbitrarily chosen initial amount (e.g. 700) or a number slightly above the last successful job response for this chilled-water consumer 16. This latter rule encourages efficient bidding (by quickly truncating expensive paths), and system stability (by encouraging repeated use of previous solutions as characterized by price).

If no job responses have been provided (e.g. no bid requests have successfully completed) at the given money limit, then at process block 68, the money limit is increased under a commonly implemented money rule and the process repeated until a success is obtained at decision block 66 and the winning bid response is implemented at the execute block 70.

Figure 6:
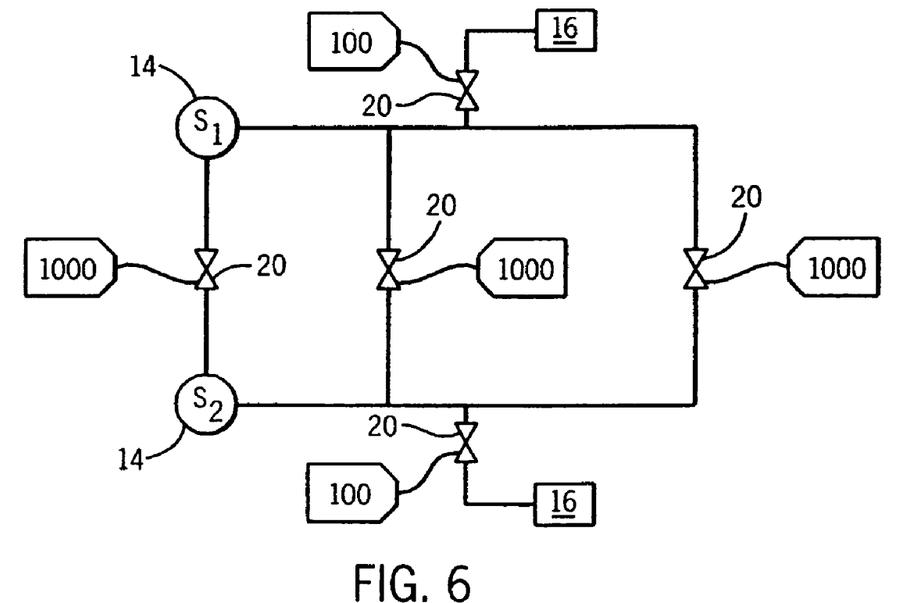
FIG. 6 is a figure similar to that of FIG. 2 showing operation of valve pricing to provide segregation of the chilled-water producers.

Referring to FIG. 6 in the present invention, the cost of a job response in the preferred embodiment is determined by a pricing rule that considers simply the sum of the cost of each valve 20 needed to connect the chilled-water producer 14 to the chilled-water consumer 16. Alternative cost mechanisms which consider the flow characteristics of the paths, for example, their hydrodynamic resistance, or other characteristics can also be used. In the preferred embodiment of the invention, the segregation valves 20 are given a higher price (e.g. 1,000) than the price (e.g. 100) of other valves 20 that do not serve in the capacity of segregation. As a result, successful job responses will tend to use valves 20 other than the segregation valves 20 thus preserving segregation between the two halves of the chilled-water distribution system 12 to the extent possible. As mentioned above, however, if a successful job response cannot be found without using segregation valves, for example because of extensive damage to the chilled-water distribution system 12, then the raising of the price at process block 68 of FIG. 5 raises the amount that can be bid to a much higher amount, e.g., 7,000, to ensure that chilled-water can be obtained in these circumstances.

Figure 7:
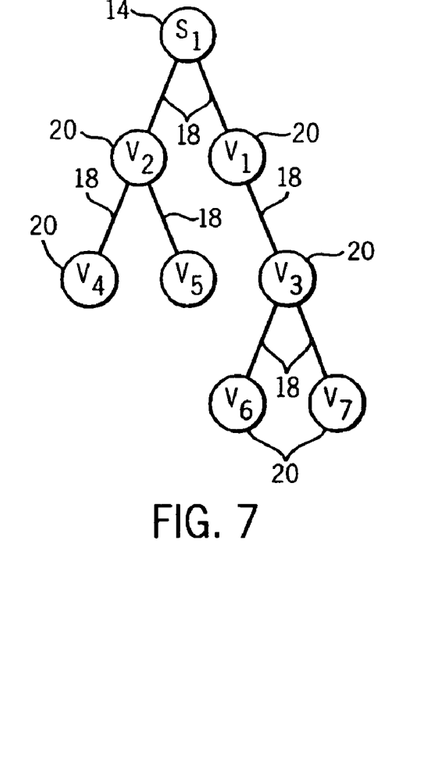
FIG. 7 shows an example configuration of the network of FIG. 2 such as may be developed by bidding autonomous control units which develop distribution paths.

Referring to FIG. 7, in order to reduce the number of bid requests processed, bid requests are only sent to valves connected by pipeways to the chilled-water producers 14a and 14b, that is, the bid requests follow the physical pathways of the distribution network. This pathway is collectively known by valves 20 which, as has been described, each know their upstream and downstream connection. Thus chilled-water producer 14 $S_1$ may be connected by pipes 18 to valve $V_1$ and valve $V_2$ and accordingly forwards the job description language bid request only to valve $V_1$ and valve $V_2$ and not from valves 20 to which it is not connected by pipes 18. Likewise, valve $V_1$ may be connected to valve $V_3$ and therefore forwards a bid request only to that valve, while valve $V_2$ may be connected to valve $V_4$ and valve $V_5$ and therefore forwards bid requests only to those valves 20.

Figure 8:
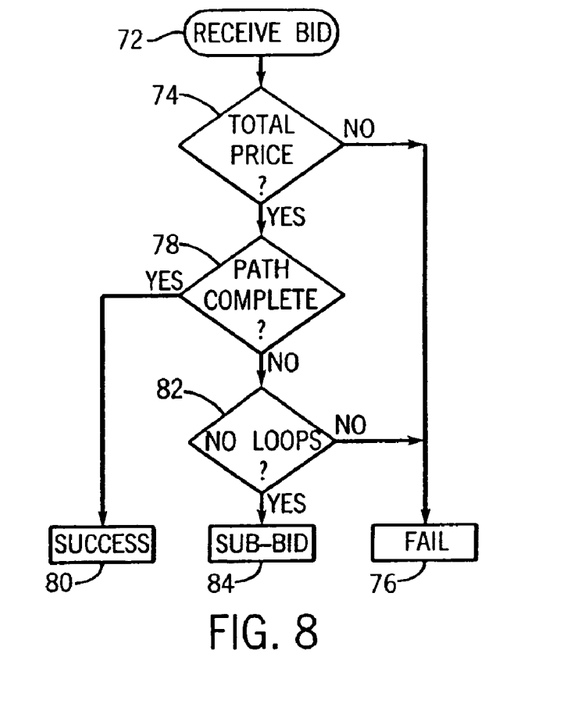
FIG. 8 is a flowchart depicting operation of an individual autonomous control unit associated with a valve such as automatically develops the paths of FIG. 7.

Referring now to FIG. 8, a given ACU receiving a bid request, as indicated by process block 72, after it determined that it has the necessary capability, evaluates whether the total price of the bid responses as so far accumulated exceeds the income limit as determined by decision block 74. If the total price is too high at this point, the bid is truncated as indicated by process block 76.

On the other hand, if the total price is acceptable, then at decision block 78 the ACU checks to see if the bid request is complete (e.g. the path is complete) as described in the job description of the bid request. If so, a success message is returned as indicated by process block 80 indicating the completed path, its cost, and the fact that it is a complete bid response. The ACU returns the successful bid response including the path and the total price. ACU's may contribute to a bid response even if they are already committed to another executing bid so long as the response does not require a change of state of the valve 20.

If the bid is not complete, then the ACU proceeds to decision block 82. Decision block 82 determines that the bids are only sent to valves that are not already on the bid path so as to prevent the possibility of loops. If the sub-bid will not create a loop, a sub-bid request is forwarded to these other ACU's that have the necessary capabilities and might complete the bid as indicated by process block 84. These sub-bids requests follow the topology of the actual distribution network as indicated and described above with respect to FIG. 7.

Figure 9:
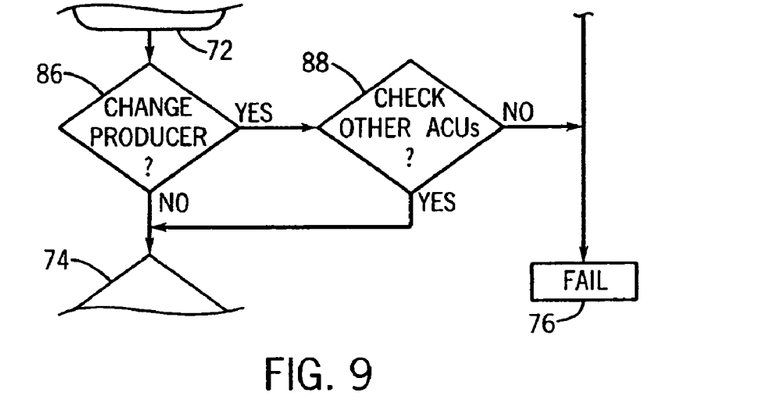
FIG. 9 is a fragmentary view of additional steps in the flowchart of FIG. 8, such steps as prevent mixing of water between chilled-water producers.

Referring now to FIG. 9, an additional decision block 86 may be placed in the program of FIG. 8 in the event that it is desired to preserve segregation of the chilled-water producers 14. As will be recalled with respect to FIG. 6, some segregation is preserved by increasing the relative price of the segregation valves 20 with respect to other valves 20. In the preferred embodiment, in the event the segregation valves 20 must be used, mixing of the water from chilled-water producers 14 is prevented by a polling between valves before they contribute to a bid. At decision block 86, before an ACU can join in a bid response, it must seek approval from directly connected valves 20 as indicated by decision block 88. Other valves must grant approval if they are closed, or if they are open and receiving water from the same chilled-water producers 14.

If at decision block 88 there are objections from any other valve 20, the bid is truncated as described above.

Referring now again to FIG. 2, as mentioned, the bid process may be initiated per process block 60 whenever chilled-water consumers 16 come on-line. Conversely, when a chilled-water consumer 16 goes off line, its valve may simply be closed and the commitment to the bid dissolved freeing up resources. Bids may also be initiated when new chilled-water sources 14 are added (for example during an upgrading process) eliminating the need for additional programming. Similarly, when a new valve 20 is added, it may automatically be incorporated into the system (after its connections have been programmed) during the next bid.

Active Diagnostics

The bidding process may also be initiated when a failure has been detected and the configuration of the chilled-water distribution system 12 must be changed. This detection may be the result of a chilled-water consumer 16 losing water and renewing a bid. Failed chilled-water producers 14 or valves 20 have self-diagnostics which may remove them from the bidding process. Alternatively, certain valves 20 may be manually removed from the system or placed in a lock mode (for example, to cordon off a leaking pipe) which also will remove them from participating in bids. The bidding process will automatically proceed to reconfigure the chilled-water distribution system 12 appropriately using the rules described above in light of such lost resources of valves or producers.

The present invention also contemplates anticipatory responses that may be taken by detecting failure before the loss of cooling water is noticed at the chilled-water consumers 16. In this regard, the present invention considers two methods of determining failure.

Figure 10:
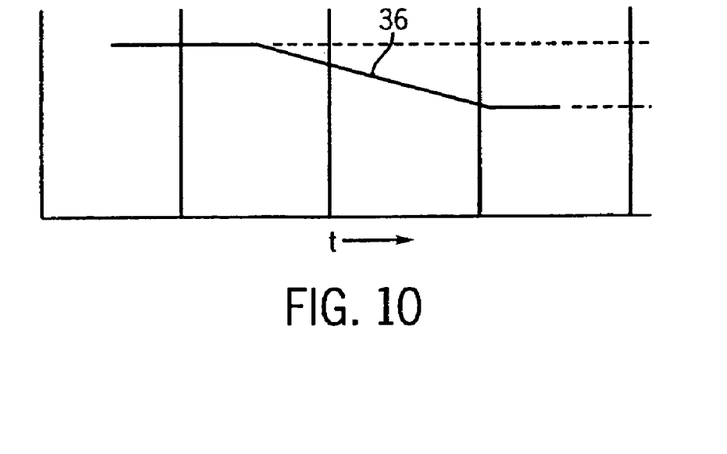
FIG. 10 is a graph showing water level in the accumulator tank of FIG. 3 such as may be used to deduce slow failures of the system.

Referring to FIGS. 3 and 10, in the first method, the tank water level 36 is tracked over time and if a predetermined decrease occurs within a predetermined time, it is assumed that there is a slow leak because the chilled-water system is closed. Normal tank level fluctuations are thus distinguished from significant but slow leaks that would be anticipated to produce a problem in the future.

Figure 11:
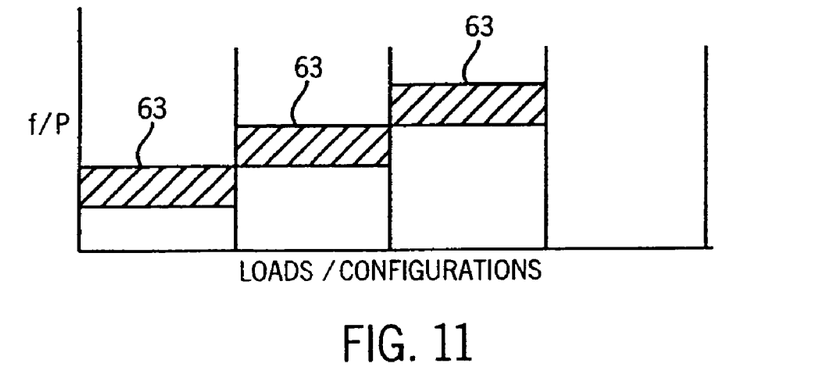
FIG. 11 is a graphical representation of a signature database that may detect more rapid failures of the system of FIG. 1.

Referring to FIGS. 11 and 3, the present invention also contemplates a detection system with faster response that may detect rapid drop in water pressure as indicating a failure. Generally, it must be understood that the water pressure fluctuates significantly depending on how many and which chilled-water consumers 16 are on line and depending on the particular connection of pipes 18. Thus, for example, three given chilled-water consumers 14 will provide a different pressure drop than three different chilled-water consumers 14 or the same three chilled-water consumers 14 connected via a different valve configuration. Further, water hammer effects cause pressure surges when valves open and close. Thus, no fixed threshold of pressure detection will suffice to detect rapid pressure drops caused by pipe failure.

Accordingly, the present invention provides a learning algorithm that may be implemented at any ACU that has pressure and flow monitoring capability. In this technique 90, illustrated in FIG. 13, a signature flow/pressure range 63 (indicating a conductance of the pipes of the system) is developed on a continuous learning basis for each combination of chilled-water consumer and each configuration of the pipes 92. These signatures may be collected in a table or functional surface that is updated (98) when that combination occurs during normal operations (as validated by no failures occurring within a subsequent predetermined time) or during a training period when the resources are cycled through combinations 94. This learning is facilitated by the fact that the present system tends toward repeating configurations as a result of the money rules described above. Since this learning period can be expensive for a central entity, the present invention encompasses embodiments in which each ACU associated with flow and pressure transducers carries out learning signatures to capture the behavior of distributed sections of the distribution network.

Figure 13:
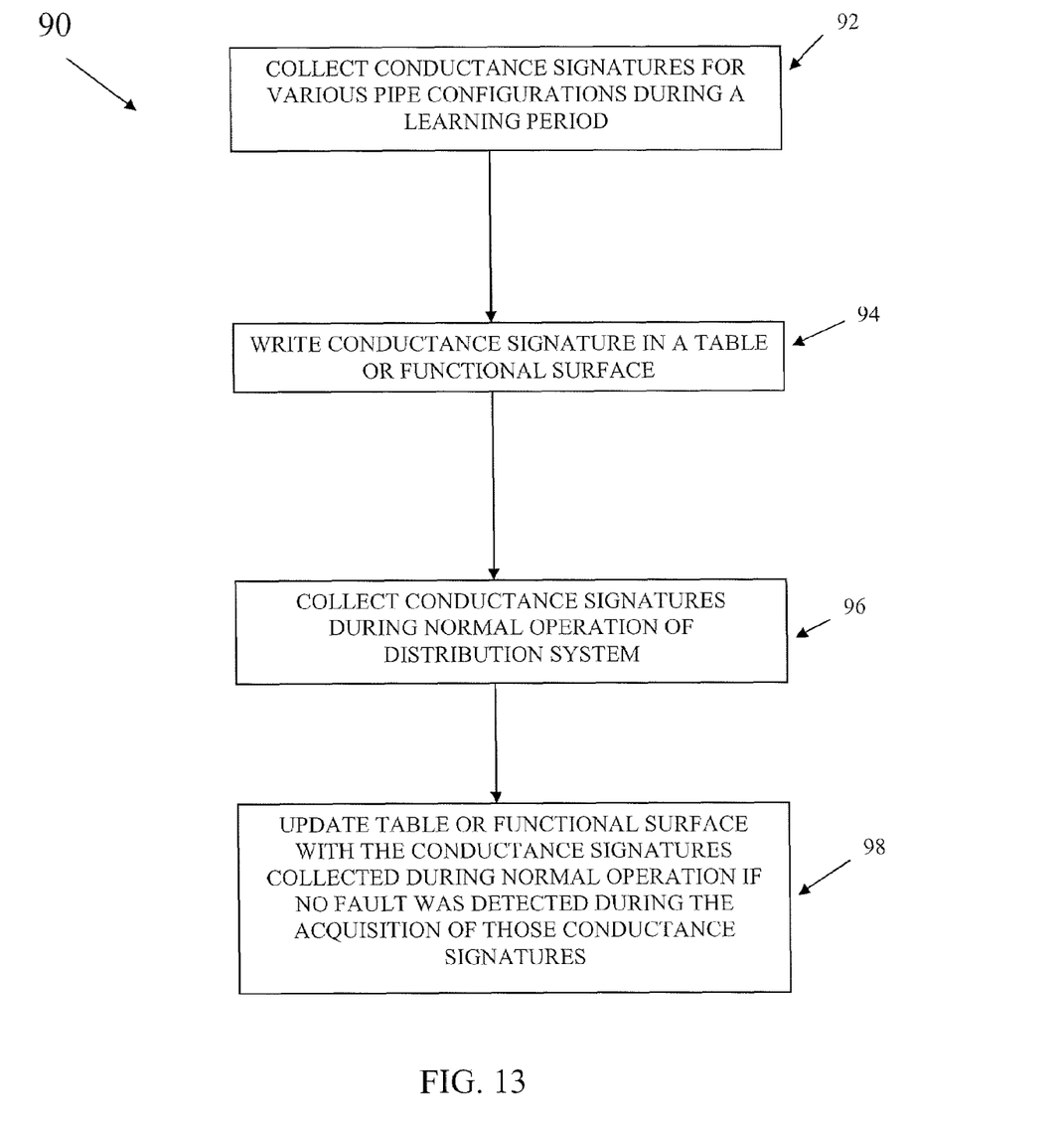

Once some number of signatures is developed, the conductance of the system is monitored 96 with respect to the range for the signature associated with that particular load combination at a time after settling of any water hammer effects. Pressure deviation outside of that range triggers a failure signal.

Figure 12:
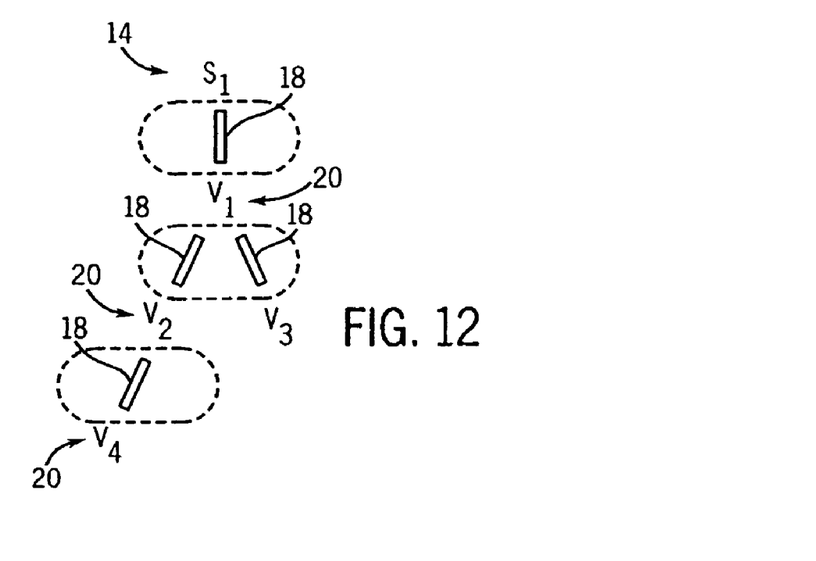
FIG. 12 is a depiction of a simplified network similar to that of FIG. 7 showing zones defined by the autonomous control units for isolation of a failure of the distribution network.

The failure may be isolated manually once brought to the attention of human operators and segregated by locking closed some valves 20. Preferably, however, the isolation of the failure is done automatically making use of the ACU architecture. Referring now to FIG. 12, a chilled-water producer Si may detect a pressure drop either through monitoring the tank per FIG. 10 or monitoring of the pressure zones per FIG. 11 indicating a leak. Alternatively, this process may be initiated by any ACU having tank or flow/pressure sensors.

Each ACU including $S_1$ has a copy of the paths associated with all executing bids and from these paths. $S_1$ may perform a simple tree based search for the source of leakage by selectively opening and closing valves 20 on those paths. For example, $S_1$ may instruct valve $V_1$ to close momentarily to see if the problem is remedied as manifested by the detection methods of FIGS. 10 or 11. If so, the problem is below valve $V_1$, if not, the problem exists between $S_1$ and $V_1$, and $V_1$ may be locked or closed (removed from the bidding) and a rebidding process undertaken to reallocate the other chilled-water consumers 14.

If the closing of valve $V_1$ does correct the problem, valve $V_2$ may be closed to see if the problem has been remedied. If it has been remedied, the problem exists below valve $V_2$, in this case between valve $V_2$ and $V_4$. Valve $V_2$ may then be closed to try to isolate the problem. If this does not work, the problem exists between valve $V_1$ and valve $V_2$ or valve $V_1$ and valve $V_3$. In this case, valves $V_1$, $V_2$, and $V_3$ would need to be closed to accommodate the problem and a report indicating this problem can be forwarded to a monitoring system.

Similarly, in the case of FIG. 7 (in which both V1 and V2 are directly coupled to S1), S1 could instruct both V1 and V2 to close momentarily and simultaneously to detect if a problem was remedied by their simultaneous closure. If the problem is not remedied by the simultaneous closure of V1 and V2, then the problem likely is between S1 and either (or both) of V1 and V2, in which case S1 would likely address the problem by shutting down. However, if the problem is remedied by the simultaneous closure of V1 and V2, then the problem likely exists below one or both of V1 and V2. To determine whether the problem is below V1 or V2 in particular, S1 would then test in alternating fashion the combination of leaving V1 open and closing V2, and vice-versa. If the problem is not occurring when V1 is open and V2 is closed but then reappears when V2 is reopened, then the problem is under V2. If the problem is not occurring when V2 is open and V1 is closed but then reappears when V1 is reopened, then the problem is under V1. (If the problem continues to occur regardless of which of V1 and V2 is closed, then the problem is a combination of problems existing under both V1 and V2.)

Upon determining that the source of the problem is below V1 or V2 (or both), further actions can be taken to determine additional information in the same manner as those discussed above. For example, assuming that the problem is determined to exist under V2, S1 can further determine whether the problem exists between V2 and V4, between V2 and V5, below V4, or below V5 (or combinations of these) by way of similar experimentation involving the closing and opening of the different valves. For example, V4 and V5 could both be closed with V2 open in order to determine whether the problem is between V2 and V4 and/or between V2 and V5. Upon determining that the problem existed between V2 and one or both of V4 and V5, V2 could be closed permanently. However, upon determining that the problem was not between V2 and V4 or between V2 and V5, S1 would then test in alternating fashion the combination of leaving V4 open and closing V5, and vice-versa, in order to determine whether the problem was below V4 or V5. Similar experiments could be conducted with respect to V1, V3, V6 and V7.

Referring momentarily to FIG. 4, if each valve 20 is instrumented to provide for pressure sensing and thus flow detection, the initiation of this isolation and detection may occur at any valve 20 as well. Desirably multiple ACU's will be equipped to provide this capability to prevent loss of centralized hardware.

A similar approach may be used to detect blockage of pipes in the event that the pressure has increased and these analogous processes may be affected on the return pipes 18*b* as will be understood from this description by one of ordinary skill in the art.

It is specifically intended that the present invention not be limited to the embodiments and illustrations contained herein, but include modified forms of those embodiments including portions of the embodiments and combinations of elements of different embodiments as come within the scope of the following claims. In particular, the present invention should be applicable to other types of distribution networks including those which distribute other materials such as fuel or air and those which distribute electrical power in the form of current under a voltage analogous to the pressure driving material fluids through a pipe.

We claim:

1. A control system for a distribution network having a plurality of elements including at least one producer and at least one consumer interconnected by a plurality of distribution lines and at least one switch, wherein the switch governs whether flow can occur between at least two elements, the control system comprising:

a plurality of autonomous control units associated with at least some of the elements of the distribution network, wherein the autonomous control units execute at least one stored program and are in communication with each other, wherein the autonomous control units are capable of sensing respective parameters of the respective elements with which the autonomous control units are associated, wherein at least one of the autonomous control units is configured to:

determine an occurrence of an anomaly within the distribution network by measuring a first value of one of the parameters at a first time; measuring a second value of the one parameter at a second time that is a predetermined amount of time after the first time; determining at least one of: whether a first difference between the first and second values exceeds a first predetermined threshold; and whether a second difference between third and fourth values that are respectively functionally related to the first and second values exceeds a second predetermined threshold; and communicate with at least one other autonomous control unit to redistribute flow within the distribution network if an anomaly within the distribution network has occurred.

2. A control system for a distribution network having a plurality of elements including at least one producer and at least one consumer interconnected by a plurality of distribution lines and at least one switch, wherein the switch governs whether flow can occur between at least two of the other elements, the control system comprising:

a plurality of autonomous control units associated with at least some of the elements of the distribution network, wherein the autonomous control units execute at least one stored program and are in communication with each other, wherein the autonomous control units are capable of sensing respective parameters of the respective elements with which the autonomous control units are associated, and wherein at least one of the autonomous control units is configured to determine the occurrence of the anomaly by: obtaining a first plurality of values of a first of the parameters of the distribution network when the distribution network is operating normally in a first configuration; determining a first range of at least one of the first parameter and an additional parameter based at least in part upon the first plurality of values; and determining whether at least one additional value of at least one of the first parameter and the additional parameter during operation of the distribution network falls outside of the first range.

3. The control system of claim 2, wherein the at least one of the autonomous control units obtains a second plurality of values of a second of the parameters of the distribution network when the distribution network is operating normally in a second configuration, and determines a second range of at least one of the second parameter and a further parameter based at least in part upon the second plurality of values.

4. The control system of claim 3, wherein the at least one of the autonomous control units determines the first and second ranges during a training period when the distribution network is cycled through the first and second configurations.

5. The control system of claim 3, wherein the first and second configurations differ in terms of at least one of the following: in the first configuration, a first producer is generating the flow and, in the second configuration, a second producer is generating the flow; in the first configuration, a first consumer is receiving the flow and, in the second configuration, a second consumer is receiving the flow; in the first configuration, the flow occurs from a first line through a first switch into a second line and, in the second configuration, the flow occurs from the first line through the first switch into a third line; in the first configuration, the flow occurs from the first line through the first switch into a second line and, in the second configuration, the flow occurs from a fourth line through the first switch into the second line; and in the first configuration, the flow occurs from the first line through the first switch into the second line and, in the second configuration, the flow occurs from a fifth line through a second switch into a sixth line.

6. The control system of claim 3, wherein the at least one of the autonomous control units determines the first range occurs on a continuous learning basis; and the values of the first and second pluralities are collected in at least one of a table and a functional surface.

7. The control system of claim 2, wherein the at least one of the autonomous control units updates the first range with an additional value that is obtained when the distribution network is operating in the first configuration, when it is determined that the distribution network is operating normally in the first configuration, and wherein the distribution network is determined to be operating normally in the first configuration when it is determined that no anomalies have occurred within a predetermined time period.

8. The control system of claim 2, further comprising obtaining a second plurality of values concerning a second of the parameters of the distribution network when the distribution network is operating normally in the first configuration, wherein the first range is of the additional parameter, and is determined upon both of the first and second pluralities of values.

9. The control system of claim 8, wherein the first parameter is a flow rate concerning flow through at least one of the elements of the distribution network, the second parameter is a pressure value associated with the at least one element, and the additional parameter is a conductance pertaining to the at least one element.

10. The control system of claim 1, wherein the distribution network is configured to distribute at least one of fuel, liquid feedstock, refrigerant, compressed air, a fluidized solid, gas, hydrogen, electricity and another fluid-like quantity.

11. The control system of claim 1 wherein, upon determining the occurrence of the anomaly, the autonomous control units further operate to determine a cause of the anomaly.

12. The control system of claim 11, wherein the at least one switch includes a plurality of switches respectively controlled by at least some of the autonomous control units, and wherein the autonomous control units cooperate to determine the cause of the anomaly by progressively switching statuses of at least some of the switches and monitoring at least some of the parameters to identify at least one element of the distribution network that is the cause of the anomaly.

13. A method of detecting an anomaly within a distribution network having a plurality of elements including at least one producer and at least one consumer interconnected by a plurality of distribution lines and a plurality of switches, wherein each of the switches governs whether flow can occur between at least two of the elements, the method comprising:

operating a plurality of autonomous control units in association with the plurality of elements, wherein each of the autonomous control units is associated with at least one of the elements, and wherein the autonomous control units are in communication with each other;

obtaining values of parameters respectively associated with operations of at least some of the elements;

determining that an anomaly has occurred by way of at least one of:
determining that at least one of a first value of a first parameter and a second value based upon the first value differs from an additional value by greater than a first threshold amount; and
determining that at least one of the first value and the second value falls outside of a predetermined range; and if an anomaly has occurred, operating at least one of the autonomous control units to communicate with at least another autonomous control unit to redistribute flow within the distribution network.

14. The method of claim 13, wherein the predetermined range is determined based upon a plurality of earlier-obtained values of one of the parameters.

15. The method of claim 14, wherein each of the values of the first parameter is obtained based upon respective first and second sensed values pertaining to second and third parameters associated with operation of at least one of the elements.

16. The method of claim 15, wherein the first parameter is conductance, the second parameter is flow rate, and the third parameter is pressure.

17. The method of claim 14, wherein the predetermined range corresponds to a first configuration of operation of the distribution network, and wherein the predetermined range is one of a plurality of predetermined ranges that respectively correspond to a plurality of configurations of operation of the distribution network.

18. The method of claim 13, further comprising: switching statuses of at least some of the switches and monitoring a plurality of parameters of the distribution network as the switches are switched in order to identify at least one of the elements of the distribution network that is the cause of the anomaly.

19. A controlled distribution network comprising: at least one resource producer; at least one resource consumer; first, second, third, and fourth links, wherein the first and third links are both coupled to the at least one resource producer and the second and fourth links are both coupled to the at least one resource consumer; first and second switchable devices, wherein the first switchable device is coupled between the first and second links and the second switchable device is coupled between the third and fourth links, and a plurality of autonomous control units respectively associated at least with some of the at least one resource producer, the at least one resource consumer, the first, second, third and fourth links, and the first and second switchable devices, wherein the autonomous control units are capable of sensing values of a plurality of parameters associated with operations of at least some of the at least one resource producer, the at least one resource consumer, the transmission links and switchable devices, and wherein upon detecting an anomaly in the controlled distribution network, at least one of the autonomous control units causes at least one of the first and second switchable devices to be switched in state, observes behavior of at least one of the parameters as the at least one switchable device is switched in state, and identifies a cause of the anomaly based upon the observed parameter behavior.

20. The controlled distribution network of claim 19, wherein the at least one resource consumer includes first and second resource consumers that are respectively coupled to the second and fourth links, and wherein upon the detecting of the anomaly by the at least one autonomous control unit, a first of the autonomous control units causes a first switching status of the first switchable device to change and, based upon primary observed information concerning a first of the parameters relating to the first link as the switching status of the first switchable device is changed, the first autonomous control unit determines whether the anomaly has been caused by at least one of the first resource consumer, the second link, and the first switchable device.

21. The controller distribution network of claim 20, wherein when it is determined that the anomaly has not been caused by any of the first resource consumer, the second link and the first switchable device, a second of the autonomous control units causes a second switching status of the second switchable device to change and, based upon secondary observed information concerning a second of the parameters relating to the third link as the switching status of the second switchable device is changed, the second autonomous control unit determines whether the anomaly has been caused by at least one of the second resource consumer, the fourth link, and the second switchable device.

22. The controlled distribution network of claim 19, wherein at least one of the autonomous control units is capable of detecting based upon at least some of the sensed values whether the anomaly has occurred.

23. The controller distribution network of claim 19, wherein each of the links is a means for communicating at least one of fluid and power.

24. A control system for a system having a plurality of components, the control system comprising:
   a network; and
   a plurality of autonomous control units in communication with one another via the network and further configured to monitor and control at least some of the components, the autonomous control units being able to monitor a plurality of parameters of operation of the components; wherein the autonomous control units are configured to:
   (a) detect an anomaly in an operational behavior of at least one of the components by at least one of:
      (i) determining that at least one of the monitored parameters and a secondary parameter based upon the at least one monitored parameter has changed by an excessive amount in relation to a predetermined value, and
      (ii) determining that the at least one of the monitored parameter and the secondary parameter has left a predetermined range;
   (b) identify a subset of the components that is a cause of the anomaly by controlling a plurality of the components to vary in status and deducing from the monitored parameters the subset that is the cause of the anomaly; and
   (c) redistributing flow from through the subset to be through another subset in response to the detected anomaly.

* * * * *